United States Patent Office
2,976,976
Patented Mar. 28, 1961

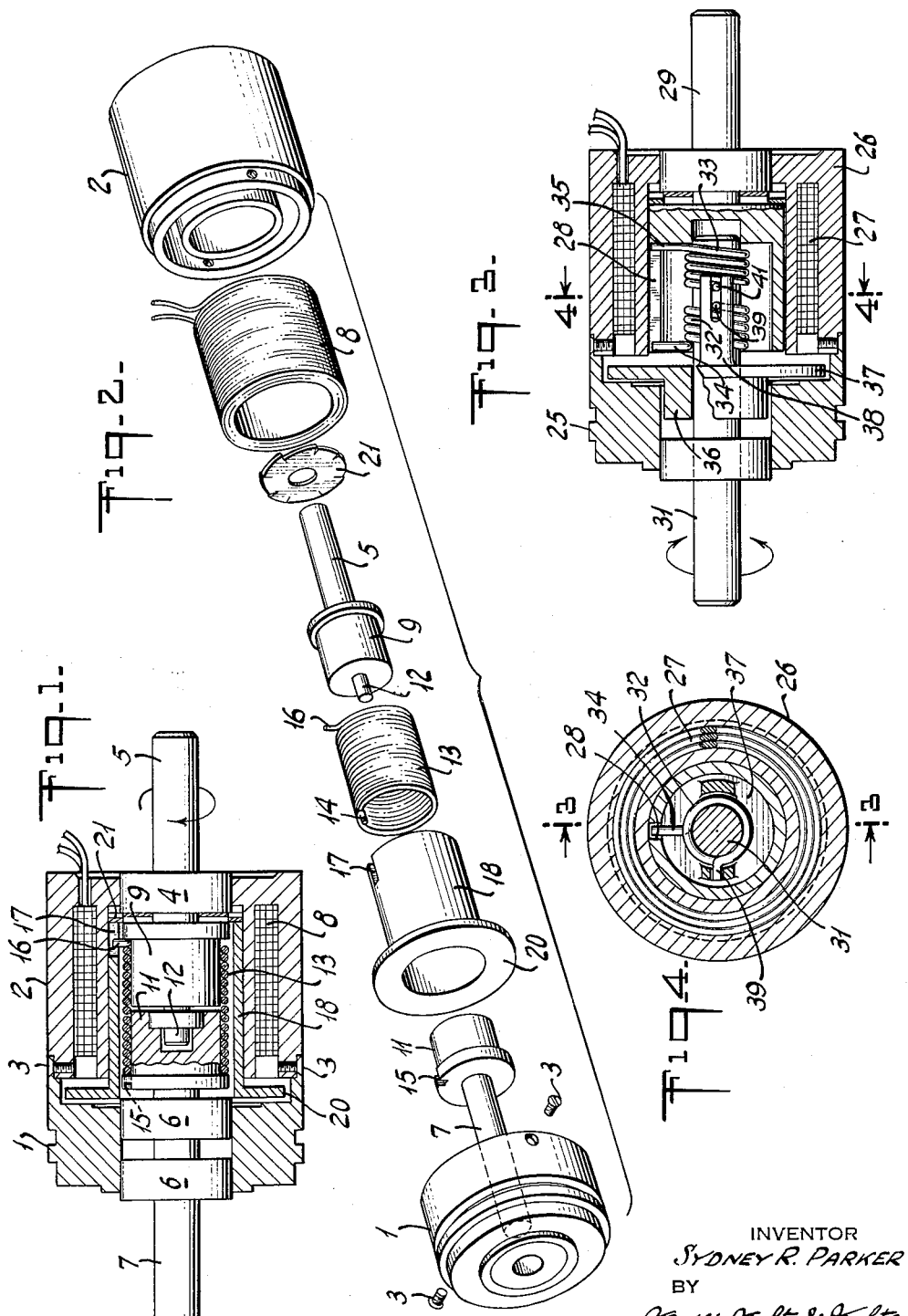

2,976,976

ELECTRO-MAGNETIC CLUTCH MECHANISM

Sydney R. Parker, 38 Browne's Terrace, Englewood, N.J., assignor of fifteen percent to Albert C. Nolte, Jr., New York, N.Y.

Filed Oct. 7, 1957, Ser. No. 688,533

12 Claims. (Cl. 192—84)

This application relates generally to clutch mechanisms for transferring power from one rotatable member to another. More particularly, this invention relates to mechanisms of this class wherein the control over the engagement and non-engagement of the respective members is accomplished by electro-magnet means.

Heretofore, it has been a common practice to design electromagnetic clutch mechanisms so that the driving member is coupled with a driven member when the electromagnetic means are energized, wherein disengagement of the driving and driven members is brought about by de-energization of the controlling electromagnetic means. This necessitates the continuous expenditure of large amounts of electrical energy, the required amount increasing as the load increases. In addition, appreciable time is required after energization of the electromagnetic means before the driven shaft is pulled into rotation with the driving shaft.

Known clutch mechanisms of this type as well as purely mechanical clutches are also customarily adapted only for use with a driving member rotating in one direction.

It is, therefore, an object of this invention to improve upon clutch mechanisms so as to effect clutch engagement when the control means are de-energized and to effect clutch disengagement when the control means are energized.

It is a further object of the invention to provide a clutch mechanism which can be controlled by very small amounts of electrical energy to effect rapid engagement or disengagement of a driving and a driven member.

It is a further object of this invention to adapt a clutch mechanism of this class for use with a driving member which may be operated bi-directionally.

The mechanism, according to the invention, employs yieldable means interconnecting a driving member with a driven member so as to transmit torque when it is rotated in a predetermined direction. Also coupled to one end of the yieldable means is a freely rotatable element disposed in the field of controlling electromagnetic means. Energization of the electromagnetic means restrains the rotation of the rotatable element, thereby loading the yieldable means so as to cause it to expand and thereby become ineffective for transmitting torque from the driving to the driven member.

Further objects of the invention, together with the features contributing thereto and the advantages resulting therefrom, will be apparent from the following description when read in conjunction with the drawings wherein:

Fig. 1 is a sectional view of one form of the invention;

Fig. 2 is an exploded view in perspective of the mechanism shown in Fig. 1;

Fig. 3 is a sectional view of another form of the invention in an embodiment adapted for use with a driving shaft operating bi-directionally and taken along line 3—3 of Fig. 4;

Fig. 4 is a sectional view taken along the line 4—4 of Fig. 3.

Reference will first be made to the embodiment of the invention shown in Figs. 1 and 2, which is a form designed for applying driving torque in one given direction, the direction being indicated by the directional arrow. The mechanism is encased in left and right hand housing members 1, 2 which may be made of any suitable material and which may be joined together by any suitable means, such as the screws 3, thus retaining the parts in proper assembled relation. The right housing member 2 is provided with a bearing 4 for supporting the driving or input shaft 5, and the left hand housing member 1 is similarly provided with bearings 6 for supporting the driven or output shaft 7 of the clutch mechanism. The right hand housing member 2 is formed with an annular receptacle communicating with the exterior face of the housing and within which is a winding 8 constituting an electromagnetic coil, for purposes which will be described hereinafter.

Integrally secured to shaft 5 near the inner end thereof is a spool member 9, and a similar spool member 11 is firmly secured to the inner end of the output shaft 7. The extreme end of the input shaft 5, which is formed with a protruding tip 12, is fitted into a recessed area of the output shaft spool member 11, so as to help hold the respective shafts in properly aligned relation.

Wound around the respective spool members 9, 11 is a yieldable element in the form of a coil spring 13, one end of which has an outwardly turned ear 14 engaging in a notch 15 formed in the flange portion of the output spool member 11. The relaxed diameter of spring 13 is sufficient so the spring only loosely contacts spool member 9 when both are at rest. It will be noted that the spring 13, viewed from right to left, is wound in a direction opposite the direction of rotation of the input or driving shaft 5. As a result, driving torque of the shaft 5 tends to tighten the spring coils thereon. This causes spring 13 to wind tightly up on driving spool member 9. The tightening of the spring also causes it to wind firmly upon the driven or output spool member 11, which tends to resist rotation to a degree directly proportionate to the output load. The result is that the spring tightens to a degree proportionate to the load, thereby providing a positive driving connection between the respective input and output shafts. This connection is usually established within a very small fraction of the first revolution of the input shaft.

The driving end of the spring 13 is formed with an upturned ear 16 engaging in a notch 17 of an electromagnetic element 18 in the form of a sleeve. Said sleeve is supported for free rotation within the right hand housing member 2 and is formed with a flange 20 disposed in close proximity to and within the field of the electromagnetic coil 8. It will be seen that the sleeve is caused to turn freely with the spring 13, and when the coil is de-energized the inertia of the sleeve is insufficient to furnish any substantial resistive effect or counter torque load on the spring 13.

Clutch disengagement is effected by energizing the winding 8, which exerts a magnetic force on the sleeve 18, which in turn imparts a load on the input end of spring 13. This causes the spring to expand and thus loosen on the input spool 9. The magnetic force on the sleeve 18 causes it to slide to the right against the end of housing member 2. Sleeve 18 is then held stationary by the effect of the electromagnetic coil 8, and driving spool 9 rotates in free slipping engagement within the spring member 13. It will, of course, be understood that the direction of winding of the electromagnetic coil 8 is such as to exert a pulling action, i.e., to the right, on the sleeve member 18. When the electromagnetic coil 8 becomes deenergized sleeve 18 is again released, permitting spring member 13 to again wind up on spool members 9 and 11 and so to again connect the input and output shafts. While flange 20 will then ordinarily again slip free of the end of housing member 2, in some cases it is desirable to provide positive means for causing it to do so. This may simply comprise a disc spring 21, preferably made of non-magnetizable material such as beryllium copper or the like in order to offset the effect of any possible residual magnetism, mounted on input shaft 5 and abutting the end of sleeve 18.

It should be noted that when the clutch is disengaged it serves to rapidly brake the rotation of output shaft 7. This occurs because that shaft is mechanically permanently coupled to sleeve 18 via the engagement between driven spool member 11, spring 13, and sleeve 18. When winding 8 is energized, tending to pull flange 20 of sleeve 18 into stationary contact with the end of housing member 2, the flange will slip against the end of that housing until the output shaft is brought to rest. The frictional contact so established assists the electromagnetic field in achieving that result.

Figs. 3 and 4 show a form of the invention adapted for use with an input shaft operating bi-directionally. In this form of the invention, the parts are placed in housing members 25, 26 containing an electromagnetic coil winding 27, the parts being generally and substantially similar to those heretofore described. In this latter embodiment, an output or driven drum 28 is integrally secured to the inner end of the output shaft 29, said drum having an interior recess for accommodating the end of the input or driving shaft 31. In this form of the invention, two separate interconnecting yieldable elements are provided in the form of coil springs 32, 33, each being wound around the input shaft 31 and disposed interiorly of the drum 28. Each of said springs has upturned projections 34, 35, respectively, engaging in a longitudinal slot formed in the drum 28 and, it will be noted, each spring is wound oppositely to the other (when viewing the apparatus from the left side of Fig. 3, spring 32 is wound counterclockwise and spring 33 is wound clockwise). In this embodiment of the invention, the electromagnetic element is in the form of a hub 36, formed with a flange 37 disposed in the field of the winding 27. The hub 36 is freely mounted on the input shaft 31 and is formed also with an arm 38 projecting inwardly of the drum 28 and shaped with a longitudinal slot engaging outturned tips 39, 41, respectively, of the spring members 32, 33.

It will be apparent from the foregoing that, with the electromagnetic coil 27 deenergized, as the input shaft starts to rotate in one direction, one of the coil springs 32, 33 will be twisted in a direction counter to its direction of winding thereby causing it to wrap tightly around the input shaft 31 and thus positively transmit torque to the driven shaft 29. The other spring member will be ineffective, since it will be twisted in the direction in which it is wound. Energization of the winding 27 places a load, through the hub 36, on the outwardly turned ear of the spring exerting the driving torque, thereby causing said spring to partially unwind and loose its grip on the driving shaft, to result in clutch disengagement. When the driving shaft rotates in the other direction, the other one of the springs 32, 33 becomes the driving connection between the respective shafts, and its operation in effecting clutch engagement and clutch disengagement is based on the same principle as aforementioned.

From the foregoing, it will be apparent that the disclosed mechanism is a highly effective mechanism for achieving the purposes intended, operates on sound mechanical, electromechanical principle, involves a minimum of parts and is economical to manufacture. While there has been described and shown herein what are regarded as preferred embodiments of the invention, it should be understood that there is no intent to have the invention limited to the exact form herein shown and described nor to anything less than the whole of the invention as hereinabove set forth and as hereinafter claimed.

What I desire to claim and secure by Letters Patent is:

1. In a device of the character described for coupling a rotatable driving member with a rotatable driven member, yieldable means interconnecting said members and frictionally bearing on said driving member, said means being wound in a direction so as to compress into winding engagement with said driving member upon the rotation thereof, electromagnetic means, and a rotatably mounted electromagnetic element disposed in the field of said electromagnetic means and driven by said yieldable means, said element when under the influence of said electromagnetic means rendering said yieldable means ineffective for transmitting torque from said driving member.

2. In a device of the character described for coupling a rotatable driving member with a rotatable driven member, yieldable means wound around said driving member and engaging with said driven member, electromagnetic means, and a rotatably mounted electromagnetic element disposed in the field of said electromagnetic means, and driven by that portion of said yieldable means engaging with said driving member, said element when under the influence of said electromagnetic means rendering said yieldable means ineffective for transmitting torque from said driving member.

3. In a device of the character described, an input member, an output member coaxially aligned therewith, a coil spring frictionally bearing on said input member and wound in a direction so as to compress into driving engagement with said input member upon the rotation thereof, one end of said spring positively engaging said output member, electromagnetic means disposed circumferentially of said members, and a rotatably mounted electromagnetic element disposed in the field of said electromagnetic means and in driving engagement with the other end of said spring, said element being axially shiftable into a stationary condition by the attraction of said electromagnetic means and when thus shifted imparting a load on said other end of the spring to expand the same rendering said spring ineffective for transmitting torque from said input member.

4. In a device of the character described, an input member, an output member coaxially aligned therewith, two coil springs wound around said input member, with one end of each spring positively engaging said output member, electromagnetic means disposed circumferentially of said members, and a rotatably mounted electromagnetic element disposed in the field of said electromagnetic means and in driving engagement with the other end of each of said springs, the ends of the springs which are held by said element and the direction of coil winding being such that when said element is under the influence of said electromagnetic means it unwinds one of said springs rendering it ineffective for transmitting the torque from said input member but winds the other for transmitting torque thereby to said input member.

5. In a device of the character described according to claim 4 wherein said coils are arranged in longitudinally spaced positions on said input member and are each wound in the same direction, the adjacent ends thereof being held by said electromagnetic element.

6. A clutch mechanism comprising an input shaft having a raised collar portion spaced inwardly from its free end, an output shaft having a raised collar portion spaced inwardly from its free end and being in longitudinal alignment with said input shaft, a coil spring arranged over the adjacent ends of said input and output shafts and extending between the raised collar portions of each and with one end of said spring connected to the collar portion of said output shaft, a bearing support frame member rotatably supporting said shafts and including a circumferentially disposed electromagnet, a rotatable control sleeve member extending over said coil spring and having a portion in engagement with the other end of said coil spring for rotation therewith, and including a portion located within the field of said electromagnet and being of a material attractable by said electromagnet, said coil spring being windable into driving engagement with said output shaft upon rotation of said input shaft in a direction to wind said spring, and means to energize said electromagnet to hold said control sleeve against rotation and to prevent tightening of said spring and driving of said output shaft.

7. A clutch mechanism comprising an input shaft, an output shaft having a portion in longitudinal alignment with said input shaft, coil spring means surrounding at least one of said shafts and interconnecting said shafts, a bearing support frame member rotatably supporting said shafts and including a circumferentially disposed electromagnet, and a rotatable control member adjacent said coil spring means and having a portion in engagement with said coil spring means and including a portion located within the field of said electromagnet and being of a material attractable by said electromagnet when the latter is actuated, said coil spring means being windable into driving engagement with said output shaft upon rotation of said input shaft, and said electromagnet being effective when energized to hold said control member against rotation and to prevent tightening of said coil spring means and driving of said output shaft.

8. A clutch mechanism according to claim 6, wherein said coil spring means includes at least two separate coil springs wound over said input shaft and in light frictional engagement therewith, said coil springs being wound in opposite directions, and wherein said output shaft includes a portion contacting an end of each of said coil springs whereby at least one of said coil springs is wound into driving engagement with said output shaft upon rotation of said input shaft in either direction.

9. A clutch mechanism for coupling a rotatable driving member with a rotatable driven member, including yieldable means interconnecting said driving and driven members and frictionally bearing on at least one of the members, said means being wound in a direction so as to be compressed into winding engagement with at least one of said members upon rotation thereof, electromagnetic means, and a rotatably mounted electromagnetic element disposed in the field of said electromagnetic means and rotated by said yieldable means, said element when under the influence of said electromagnetic means rendering said yieldable means ineffective for transmitting torque from said driving member.

10. A clutch mechanism according to claim 9, wherein said yieldable means includes two separate coil springs arranged over said driving member and wherein said driven member includes a portion in engagement with an end of each of said coil springs, said coil springs being wound in opposite directions whereby rotation of said driving member in either direction is effective to tightly wind one of said coil springs to rotate said driven member when said electromagnetic means is not influencing said electromagnetic element.

11. A clutch mechanism according to claim 10, wherein said electromagnetic element includes a portion overlying said springs having a slot defined thereon, and wherein an end of each of said springs extends into said slot.

12. A clutch mechanism according to claim 9, including a resilient member adjacent said electromagnetic element biasing said element in a direction away from said electromagnetic means.

References Cited in the file of this patent

UNITED STATES PATENTS

| | | |
|---|---|---|
| 459,042 | King et al. | Sept. 8, 1891 |
| 647,436 | Beck | Apr. 10, 1900 |
| 1,481,153 | Rosendahl | Jan. 15, 1924 |
| 2,002,979 | Fisher | May 28, 1935 |
| 2,192,842 | Schat et al. | Mar. 5, 1940 |
| 2,534,033 | La Brie | Dec. 12, 1950 |
| 2,595,213 | Raynor | Apr. 29, 1952 |
| 2,643,749 | Greenlee | June 30, 1953 |
| 2,685,949 | Dunlap | Aug. 10, 1954 |
| 2,725,758 | Dickey | Dec. 6, 1955 |

FOREIGN PATENTS

| | | |
|---|---|---|
| 539,361 | Great Britain | Sept. 8, 1941 |
| 780,238 | Great Britain | July 31, 1957 |